March 7, 1967 B. J. COHON 3,307,647
ELECTROMAGNETIC PRECISION APPARATUS FOR ASCERTAINING THE
UNKNOWN WEIGHT OF AN OBJECT
Filed Oct. 20, 1965

INVENTOR.
BERTRAM J. COHON
BY
Kinschstein, Kinschstein & Ottinger
ATTORNEYS

United States Patent Office 3,307,647
Patented Mar. 7, 1967

3,307,647
ELECTROMAGNETIC PRECISION APPARATUS FOR ASCERTAINING THE UNKNOWN WEIGHT OF AN OBJECT
Bertram J. Cohon, Hackensack, N.J.
(781 River St., Paterson, N.J. 07524)
Filed Oct. 20, 1965, Ser. No. 498,932
9 Claims. (Cl. 177—201)

This invention relates to an electromagnetic precision apparatus for ascertaining the unknown weight of an object. Such an apparatus will be referred to hereafter as a weighing apparatus.

It has been proposed to employ electromagnetic means in high-precision weighing devices in order to aid in the finite determination of the unknown weight of objects. Typical of the prior art are null-balance weighing devices in which the object, the weight of which is to be found, is placed on a pan which consequently causes deflection of a balance. The field of an electromagnet is applied to the balance in a manner to restore the balance to a "zero" of dynamic equilibrium position. The intensity of the field needed to restore the balance to this position is determined and used to derive the weight of the object.

Still other weighing apparatuses employing electromagnetic means which are described in the art include an electromagnet in the form of a coil. The weight of an object is applied to the armature of the solenoid so as to shift said armature partially out from said solenoid. Such movement is resisted by the field of the solenoid and the weight of the object is determined as a function of the displacement of the armature in a position of dynamic equilibrium that is reached.

It will be observed that a common characteristic of these weighing apparatuses including electromagnetic means is their dependency upon an accurate determination of the dynamic equilibrium position of a member under the influence of the object to be weighed. The accuracy of the weighing apparatus is in fact in large part dependent upon the exactness with which the initial and subsequent locations of said member can be compared.

In the first mentioned example of the prior art wherein a balance deflected by an object is brought back to a dynamic equilibrium position by an electromagnet, the quantum of electromagnetic force is determined when the balance returns to its precise initial position. If the balance stops a little short of or a little beyond its zero equilibrium position, and a determination of the electromagnetic force is made, the results will be adversely affected. Consequently, an accurate measurement of the final position of the member is required, as well as an accurate measurement of electromagnetic force, in order to achieve good results.

In the second mentioned example of the prior art wherein the object to be weighed shifts the armature of a solenoid, a precise comparison of the initial and displaced dynamic equilibrium positions of the armature is essential if valid data is to be attained, this being in addition to the measurement of electromagnetic force.

The aforesaid positional determinations may be carried out in several ways. They may be determined visually by an operator of the apparatus, as by comparison of the position relative to a fixed scale of the member influenced by the object. This method of proceeding has obvious operator-induced human inaccuracies which are incompatible with good results. Optical sensors such as photoelectric cells are also in common use, but are frequently very expensive and complex especially when coordinated with other required circuitry. Further, temporal or positional errors may occur during the period that an element of the apparatus enters the field of the sensor to the point at which it actuates the sensor. Mechanical feeling devices are subject to the same deficiencies.

Accordingly, it is the primary object of my invention to provide an electromagnetic weighing apparatus capable of yielding highly precise weight determinations in which the previous necessity for the accurate location of a component of the apparatus under the influence of the object being weighed is eliminated and it only is necessary to accurately measure electromagnetic force.

It is another object of my invention to provide an electromagnetic weighing apparatus of the character described which operates on the principle that an initially high electromagnetic force is gradually lowered until at a discrete point it reaches a strength that is minutely less than the weight of the object whereupon the position of the object is abruptly shifted whereby the weight of the object can be determined as a function of the strength which prevails at the moment of the sudden shifting rather than as a function of the strength present at a moment of delicate positional balancing of weight versus field strength.

It is a further object of my invention to provide an electromagnetic weighing apparatus of the character described which is few in number of parts and simple in circuitry, which eliminates the need for accurate visual observation, optical sensors or mechanical feelers, and yet which yields results comparable with previous complex weighing apparatuses.

Other objects of my invention in part will be obvious and in part will become apparent to the reader in the following description.

My invention accordingly consists in the features of construction, combinations of elements, arrangements of parts and series of steps which will be exemplified in the weighing apparatus and method hereinafter described and of which the scope of application will be indicated in the appended claims.

In the accompanying drawings in which is shown one of the various possible embodiments of my invention, FIG. 1 is a front perspective view of an electromagnetic precision weighing apparatus incorporating my invention;

Figure 1:
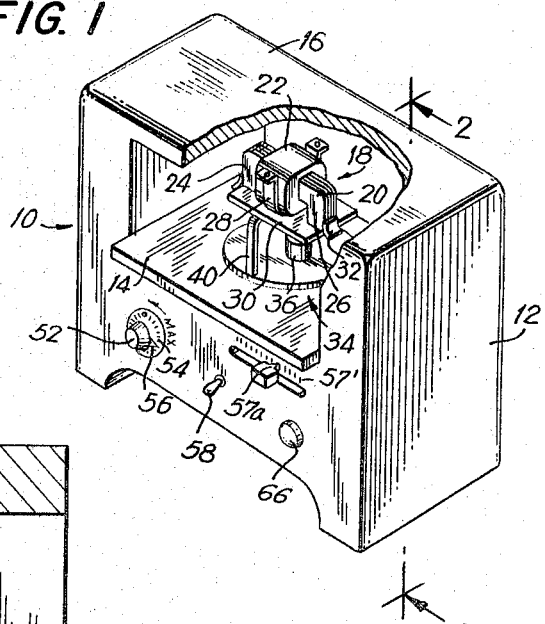
Figure 2:
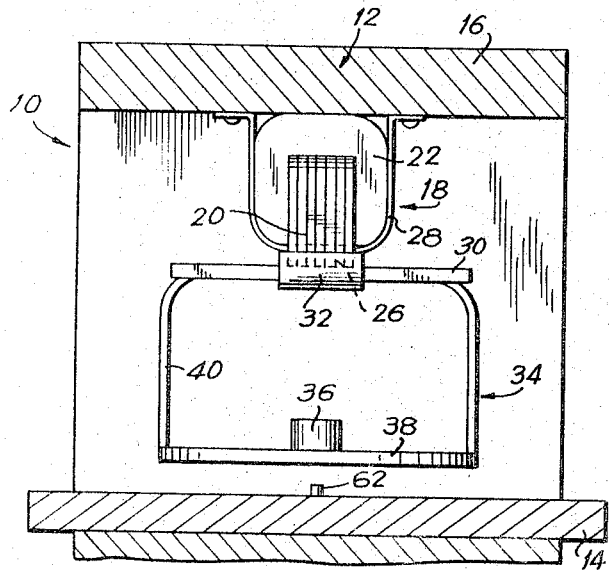
FIG. 2 is an enlarged transverse cross-sectional view thereof taken substantially along the line 2—2 of FIG. 1.

In general, and in accordance with the teaching of my invention, I provide an electromagnetic precision weighing apparatus including an electromagnet mounted on a supporting frame and circuit means for energizing the magnet in such a manner as to enable an operator to adjustably vary the strength of the field of the electromagnet between high and low levels. A pan adapted to hold objects to be weighed is secured to an armature of the electromagnet. The weighing pan and armature are arranged so that they are held against a stop by the magnetic force of the electromagnet and so that the force of gravity tends to pull said pan and armature away from the stop. Means is also provided to indicate to an operator the value of a variable that is a function of the strength of the magnetic field.

To weigh an object, the magnetic field is set at a relatively high level, the object to be weighed is placed into the weighing pan, and the armature supporting the pan is held by the field against the stop against the force of gravity. Then, the operator gradully decreases the strength of the field until the field reaches a discrete point at which the weight of the armature and the pan together with the object thereon overbalance the attraction of the field thereby causing the armature, pan and object abruptly to fall away from the stop under the influence of gravity. The strength of the field at this point, as shown by the indicating means, manifests the weight of the object.

It will be seen that the foregoing structure enables me to provide in a device of few parts and simple circuitry a very highly accurate weighing apparatus. I have completely eliminated any need for determining the exact dynamically balanced position of any component of a weighing apparatus, which component is influenced by the object being weighed. Of course, I must determine the point at which the pan object and armature of my apparatus drop away from the stop, but this is merely a gross determination and does not require the very exact positional determination necessary in the weighing devices of the prior art. The precision of my apparatus is dependent solely upon the accuracy of the determination of the strength of the field at the time that the armature, weight and pan drop from the stop and this is easily effectuated by observing the indicating means. Accuracy is improved by controlling the input source of power or by utilizing a voltage regulator. Highly precise components of this type can be purchased on the market.

Referring now in detail to the drawings, the reference numeral 10 denotes an electromagnetic precision weighing apparatus constructed in accordance with my invention. Said apparatus includes a frame or housing 12 which mounts the other components of my invention in its hollow interior and which also physically supports the circuitry for the apparatus. The housing is adapted to stand on any horizontal flat surface, as for example a table, and is desirably constructed of non-magnetic material, e.g. wood or plastic. The housing supports a horizontal shelf 14. The shelf 14 and the top wall 16 of the housing define an open area in which the weighing operations take place and which is of sufficiently large dimensions to permit the same.

My weighing apparatus 10 further includes an electromagnet 18 including, as is conventional, a laminated iron core 20 of magnetic material having minimal remanence, e.g. soft iron, and an energizing winding 22 which girdles the mid-section of the core. The core 20 preferably is U-shaped with its legs extending downwardly so that its poles 24, 26 are in the same horizontal plane, are relatively close to one another and are exposed. The proximity of the poles engenders a magnetic field of small size so as to minimize extraneous influence thereon which in turn enhances the accuracy of my weighing apparatus. A small yoke-bracket 28 secures the electromagnet 18 to the underside of the top wall 16 of the apparatus 10.

My weighing apparatus further includes, associated with the electromagnet 18, an armature 30 of magnetic material having minimal remanence, e.g. soft iron. In the embodiment illustrated, the armature 30 is rectangular in shape and spans the distance between the poles 24, 26 of the electromagnet 18. To insure that the armature 30 is in the same location each time it is held against the poles, two non-magnetic guides 32, one attached to the outside of each of the poles, horizontally locate the armature when it is in said position. This increases the accuracy of my apparatus. The poles serve as stops to limit upward movement of the armature when the electromagnet is energized.

A non-magnetic pan 34 adapted to support any object 36 to be weighed is secured to the armature 30. The weighing pan includes a flat horizontal disk 38 on which the object 36 may be placed and a pair of vertical arms 40 which run from the periphery of the disk to the ends of the armature 30. When the strength of the electromagnet 18 is set at a high level, the armature 30 is attracted to and held fixedly against the poles 24, 26 of the electromagnet. The magnet also supports the weighing pan 34 carried by the armature and any object 36 to be weighed supported on the pan. The electromagnetic force is opposed by the effect of gravity on the armature, the weighing pan and the object 36. At a high level of field strength the force exerted by the electromagnet exceeds the combined weight of the armature, pan and weight which accordingly are held stationary.

Figure 4:
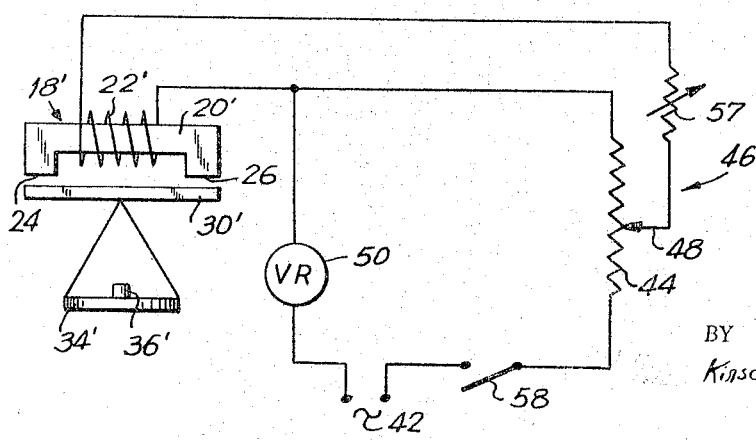
FIG. 4 is a circuit diagram for my weighing apparatus.

Circuit means permits an operator of the apparatus 10 to control and adjust the power applied to and thereby the strength of the electromagnetic field. The strength of the field can be varied between high and low levels. The high level is dependent upon the maximum of the desired range of objects to be weighed, and the low level may be of practically no magnetic force. FIG. 4 illustrates a schematic diagram for said circuit means and includes an A.C. source of power 42 which supplies voltage to opposite sides of a resistor 44 of a potentiometer 46. The tap 48 of the potentiometer leads to one terminal of the energizing coil 22' which surrounds the core 20' of the electromagnet 18'. The other terminal of the coil is connected to a terminal of the resistor 44. The electromagnet 18' acts upon the armature 30' which supports the weighing pan 34' as well as the object 36' to be weighed. A voltage regulator 50 is connected in series between the power source 42 and the potentiometer 46 to maintain the applied voltage at a constant level and consequently prevents voltage gains or drops in the power source from affecting my apparatus.

As has been stated, the circuit means just described is arranged to be controlled by an operator and to this end an exposed regulating knob 52 of the potentiometer 46 is mounted on the front face of the apparatus housing 12. The strength of the field is indicated by an index scale 54 which may be read against the position of the pointer 56 of said knob. Said reading means may be graduated in abstract units or may be calibrated to units of weight. Thus, an additional fine reading may be taken with the aid of a variable small resistor 57, having a reading scale 57', series interposed on the tap circuit of the potentiometer 46. The circuit also includes a manually operable on/off switch 58, also mounted on the front face of the housing.

Figure 3:
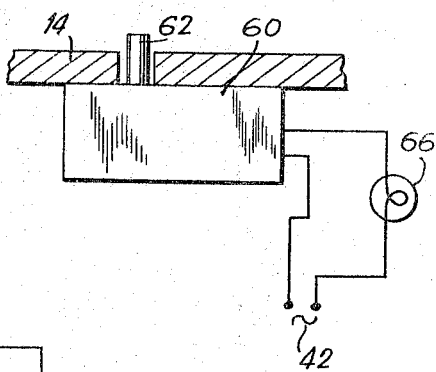
FIG. 3 is an enlarged view of a sensing switch together with its circuit.

Means is provided to visually indicate to an operator when the armature 30 and weighing pan 34 have fallen under the influence of gravity away from the electromagnet 18, this being the discrete point at which the previously prevailing static equilibrium is suddenly disrupted and, therefore, the point at which the weight measurement is to be read. Said means includes a normally open momentary snap switch 60 mounted on the underside of the shelf 14. (See FIG. 3.) The switch is operated by a feeler 62 which has a head protruding upwardly through and slightly above the shelf 14 directly beneath the pan 38. The switch 60 is connected in series with the A.C. source of power 42 and a signalling means such as a light 66 or a buzzer. The light 66 is mounted on the front face of the housing 12. The switch 60 is closed when the feeler 62 is depressed by the weighing pan 34, thereby completing the circuit and energizing the light 66 and thus indicating that the pan has dropped. Preferably, the space between the bottom of the pan and the top of the shelf is small, e.g. in the order of ⅛ inch, so that the dropping of the pan will be sensed almost immediately and so that the object 36 will be minimally jarred.

My weighing apparatus 10 is operated in an extremely simple manner as follows: The switch 58 is closed and the field of the electromagnet 18 is set at its maximum level by setting the potentiometer 46 and resistor 57 to apply full regulated voltage to the coil 22. The armature 30 and the weighing pan 34 are positioned so as to be held by the field in static position against the poles of the magnet. The object whose weight is to be determined is placed on the weighing pan. No object can be weighed whose weight exceeds the lifting force of the electromagnet. Such objects will be weighed on an apparatus whose electromagnet can exert a greater lifting force. Then the operator by rotation of the knob 52 and/or increasing the effective value of the resistor 57 slowly decreases the voltage applied to the electromagnet and consequently slowly decreases from its initial high level the lifting electromagnetc force applied to the armature 30. The force is decreased until it reaches a point at which the force of gravity acting on the armature, the pan and the object to be weighed, just overcomes the lifting force exerted by the field and drops. This point is properly defined as "discrete" since it is accompanied by an abrupt gross, i.e. falling, movement of the pan and armature displaced by the force of gravity. The drop of the pan is indicated by lighting of the signal lamp. The position of the pointer 56 on the scale 54 indicates the relative strength of the field at this point, and said scale can be readily calibrated to enable the operator to directly read the weight of the object 36, taking into account the constant weights of the armature and weighing pan. If the resistor 57 is used an additional fine reading can be taken from the setting of the pointer 57a on the scale 57'.

If desired, I may employ a servomotor to drive the potentiometer in a direction to decrease the strength of the magnetic field, said servomotor being automatically deenergized upon the activation of the switch 60 thereby to automatically determine the weight of the object placed on the scale for weighing. There thus need be no reliance upon an operator's delicacy of the adjustment of the potentiometer. Furthermore, I may utilize any other circuit measuring means to determine the strength of the magnetic field and thereby the weight of the object; for instance, instead of measuring the setting of the potentiometer, I may measure the current flowing through the solenoid with the aid of an ammeter or any other instrument that will measure a circuit parameter which varies as a function of the strength of the magnetic field, so that the reading of such instrument at the time the weight drops will be a function of said weight.

I have thus provided an electromagnetic weighing apparatus which completely eliminates the need for determining a dynamic equilibrium position or any precise balancing position of the components of the apparatus under the influence of the force of gravity. Rather, I need only determine the discrete point at which an armature is dropped from an electromagnet and thereupon the weight of the object is a function of the strength of the field at this discrete point.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described my invention, I claim as new and useful, and desire to secure by Letters Patent:

1. An electromagnetic weighing apparatus for the precision weighing of objects, said apparatus including an electromagnet, regulatable circuit means variably energizing the electromagnet and adjustably controlling the strength of the field thereof between high and low levels, means indicating the relative level of the strength of the field, an armature associated with said electromagnet, a pan adapted to support an object whose weight is to be determined, said pan being secured to the armature, the armature having an initial static position at a high level of field strength held against a pole of the electromagnet, said pole constituting a stop, and abruptly dropping under the influence of gravity to a position displaced from said pole when the level of field strength is reduced to a point between said high and low levels, the weight of the object being a function of the field strength at said point.

2. An electromagnetic weighing apparatus as set forth in claim 1 wherein means is provided to emit a signal when the armature drops to its displaced position.

3. An electromagnetic weighing apparatus as set forth in claim 1 wherein the circuit means applies controllably variable electrical energy to the electromagnet.

4. An electromagnetic weighing apparatus as set forth in claim 1 wherein the circuit means applies controllably variable electrical power to the electromagnet.

5. An electromagnetic weighing apparatus as set forth in claim 1 wherein the circuit means applies a controllably variable voltage to the electromagnet.

6. An electromagnetic weighing apparatus as set forth in claim 1 wherein the energizing circuit means includes a supply voltage and a voltage regulator for holding the voltage supplied at a constant level.

7. An electromagnetic weighing apparatus as set forth in claim 1 wherein the electromagnet has two proximate poles, the armature spanning said poles in its initial position.

8. A method for precisely weighing objects comprising the steps of:
 (a) setting the field strength of an electromagnet at a high level;
 (b) supporting the object to be weighed in an initial static position against a stop by said field at said high level; and
 (c) decreasing the strength of the field to a point at which the object is displaced from its initial position by the force of gravity,
 (d) whereby the weight of the object is a function of the strength of the field at said point.

9. A method for precisely weighing objects comprising the steps of:
 (a) setting the field strength of an electromagnet at a high level;
 (b) supporting the object to be weighed in an initial static position against a stop by said field at said high level;
 (c) decreasing the strength of the field to a point at which the object is displaced from its initial position by the force of gravity; and
 (d) determining the weight of the object as a function of the strength of the field at said point.

References Cited by the Examiner
UNITED STATES PATENTS

| 2,864,604 | 12/1958 | Cirlin | 177—264 |
| 3,089,553 | 5/1963 | Gast | 177—1 |
| 3,185,232 | 5/1965 | Iwasaki | 177—225 |

RICHARD B. WILKINSON, *Primary Examiner.*

R. S. WARD, *Assistant Examiner.*